(12) United States Patent
Cham et al.

(10) Patent No.: US 7,049,570 B2
(45) Date of Patent: May 23, 2006

(54) OPTICAL CHIP COUPLING SYSTEM UTILIZING MICROMACHINE ADJUSTABLE OPTICAL ELEMENTS AND A FEEDBACK CIRCUIT PROVIDING THE MICROMACHINE WITH A FEEDBACK SIGNAL CORRELATED TO AN OPTICAL SIGNAL PARAMETER

(75) Inventors: Kit M. Cham, Cupertino, CA (US); Frank H. Peters, San Jose, CA (US)

(73) Assignee: Avago Technologies, Ltd., Singapore (SG)

( * ) Notice: Subject to any disclaimer, the term of this patent is extended or adjusted under 35 U.S.C. 154(b) by 22 days.

(21) Appl. No.: 10/245,632

(22) Filed: Sep. 16, 2002

(65) Prior Publication Data

US 2004/0051028 A1    Mar. 18, 2004

(51) Int. Cl.
*G01J 1/20* (2006.01)

(52) U.S. Cl. .................... 250/201.1; 385/18

(58) Field of Classification Search ............ 250/201.1, 250/227.21, 227.11, 216; 385/16, 18; 370/216; 359/298

See application file for complete search history.

(56) References Cited

U.S. PATENT DOCUMENTS

| | | | |
|---|---|---|---|
| 5,923,466 A * | 7/1999 | Krause et al. ............ 359/389 |
| 6,137,693 A | 10/2000 | Schwiebert et al. | |
| 6,144,213 A | 11/2000 | Johnson | |
| 6,203,212 B1 | 3/2001 | Rosenberg et al. | |
| 6,215,222 B1 * | 4/2001 | Hoen ........................ 310/309 |
| 6,243,508 B1 | 6/2001 | Jew ell et al. | |
| 6,522,441 B1 * | 2/2003 | Rudeen ..................... 359/196 |
| 6,539,142 B1 | 3/2003 | Lemoff et al. | |
| 6,640,023 B1 * | 10/2003 | Miller et al. ................ 385/17 |
| 6,798,941 B1 * | 9/2004 | Smith et al. ................ 385/18 |
| 2002/0094149 A1 * | 7/2002 | Barrett ....................... 385/15 |
| 2003/0184844 A1 * | 10/2003 | Yazdi et al. ................ 359/298 |

* cited by examiner

Primary Examiner—Thanh X. Luu

(57) ABSTRACT

An optical communication system including an integrated circuit chip, an electro-optical chip operatively integrated on the integrated circuit chip, an adjustable optical chip which includes at least one optical element disposed between the electro-optical chip and one of a source or recipient of at least one optical signal, at least one micromachine operatively coupled to the at least one optical element to selectively manipulate the at least one optical element; an optical signal sensor disposed relative to the at least one optical signal to sense an optical signal condition data, and to transmit said optical signal condition data to the integrated circuit chip, a feedback circuit between the integrated circuit chip and the at least one micromachine, the integrated circuit chip configured to receive the optical signal condition data, convert it to a corresponding feedback signal, and to transmit the feedback signal through the feedback circuit to the micromachine, thereby causing the micromachine to selectively manipulate the at least one optical element to alter the optical signal.

14 Claims, 8 Drawing Sheets

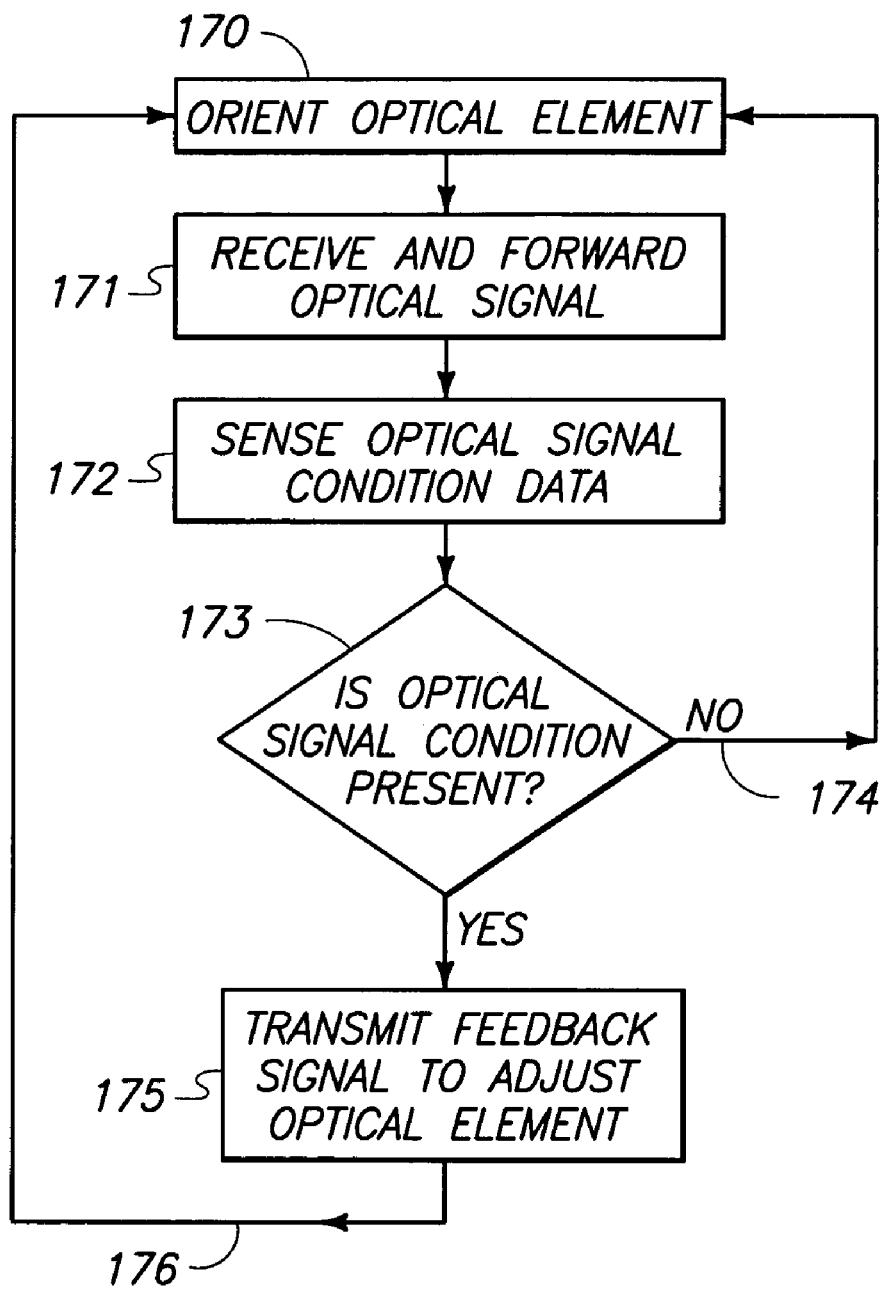

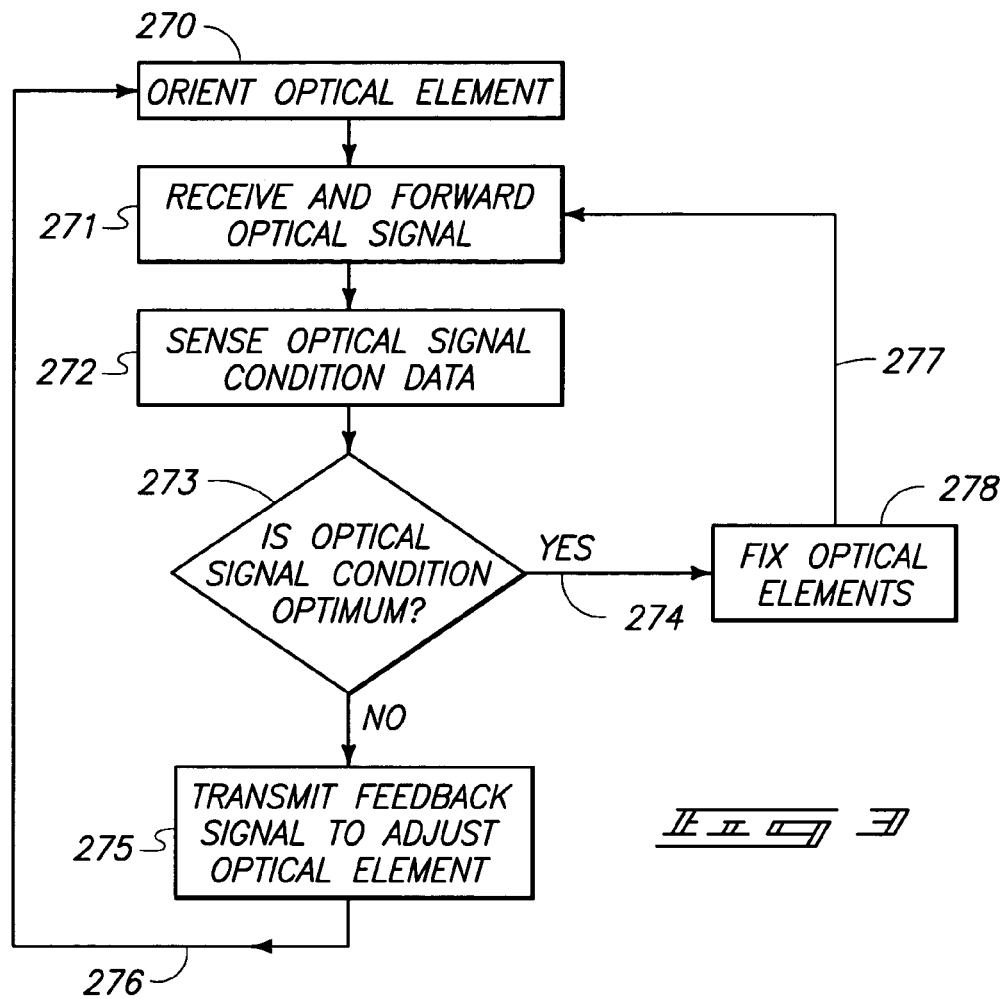
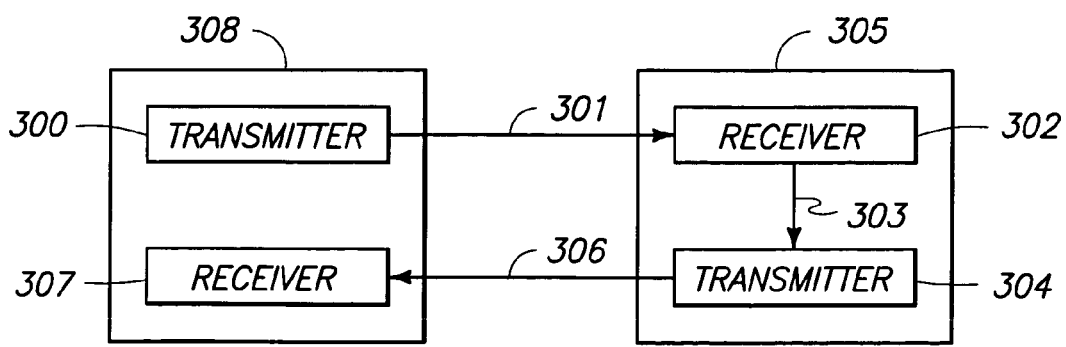

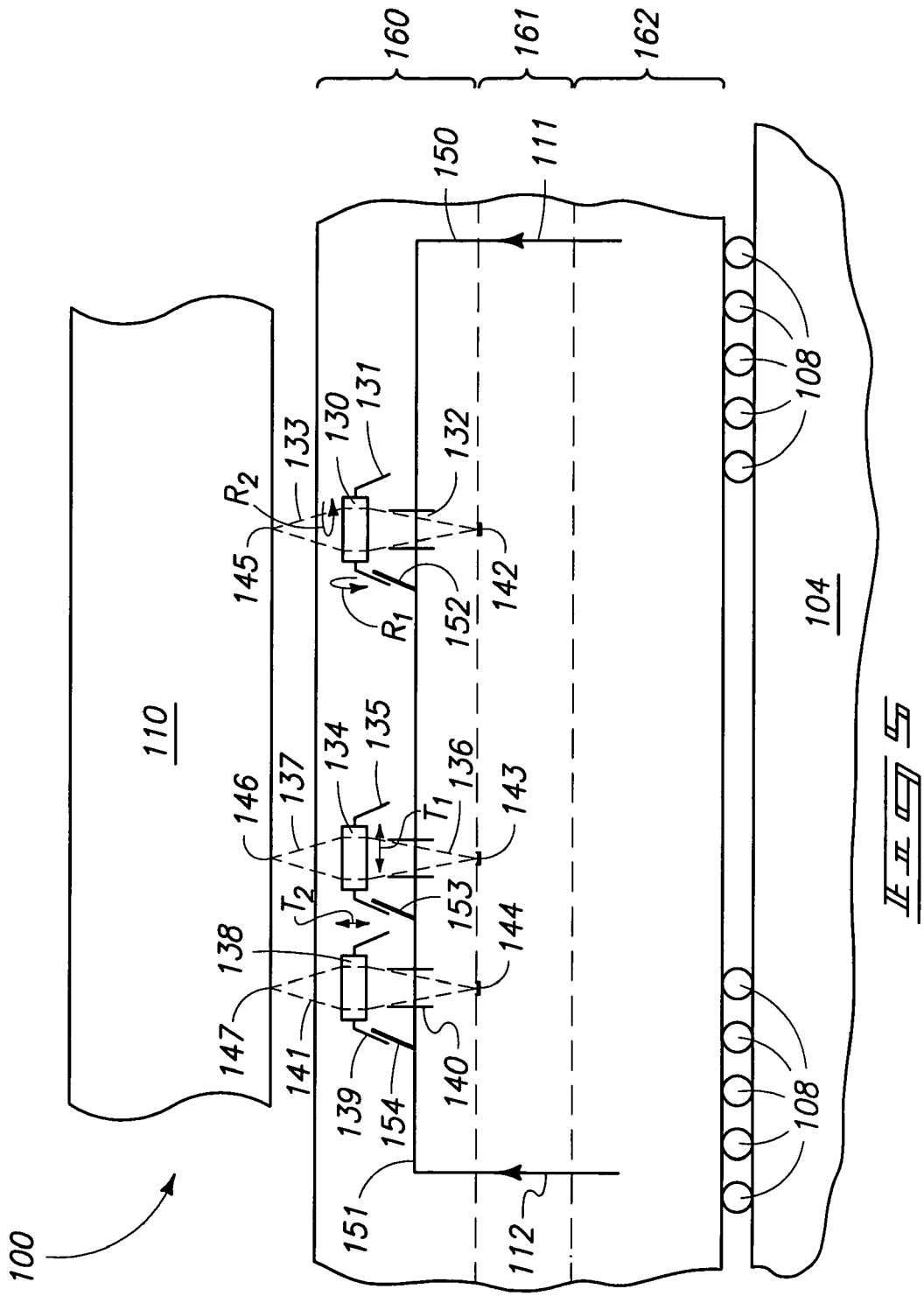

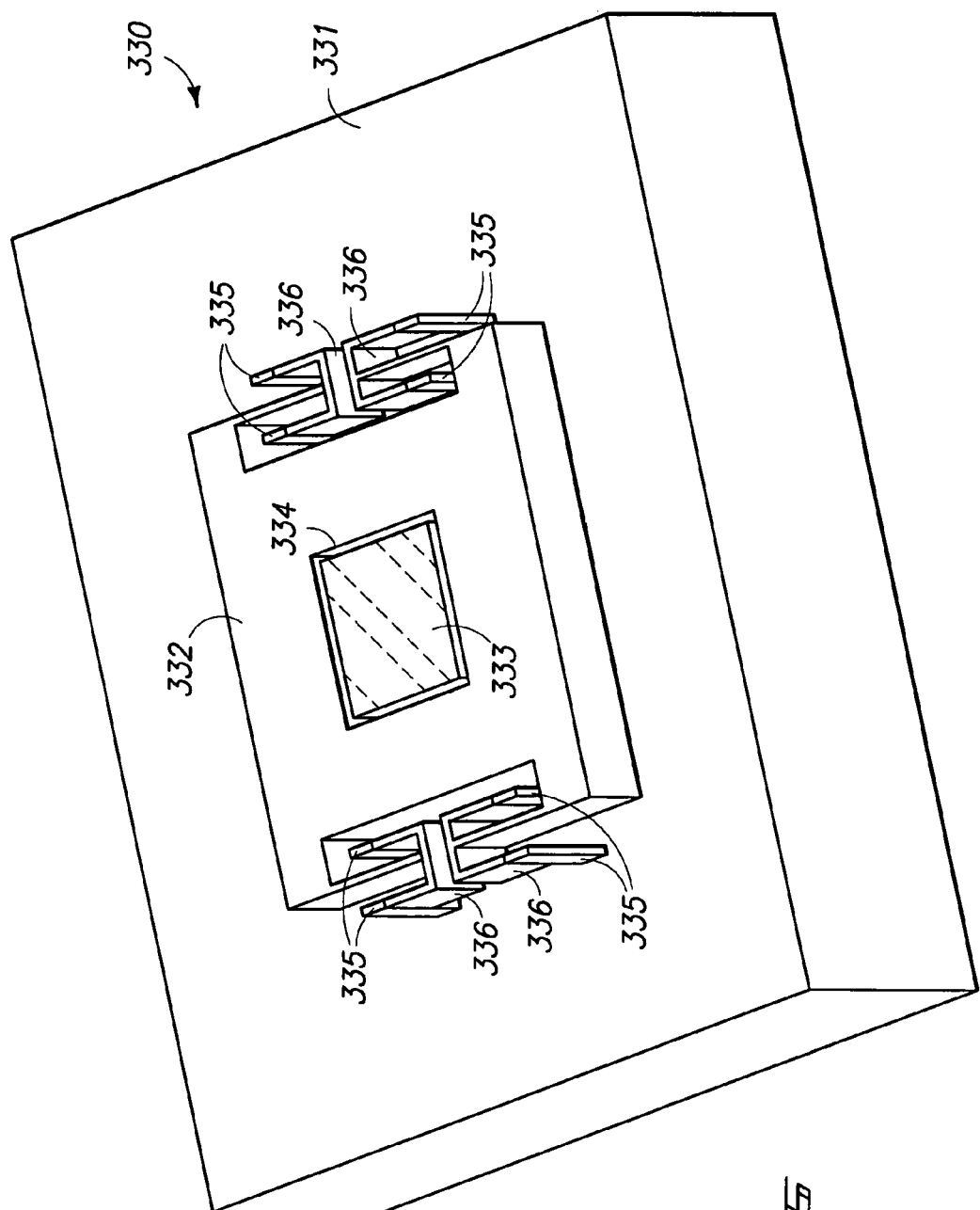
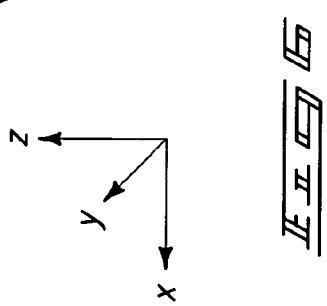

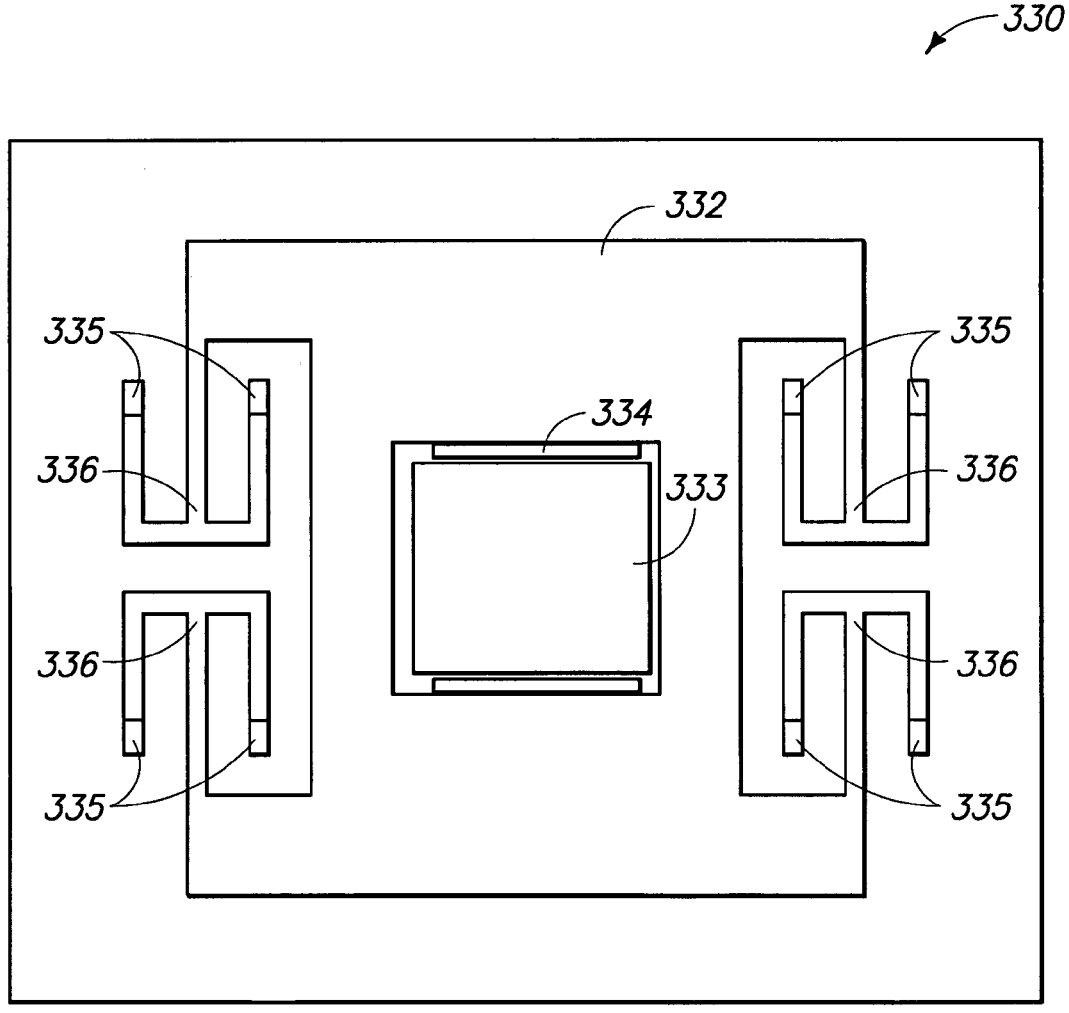

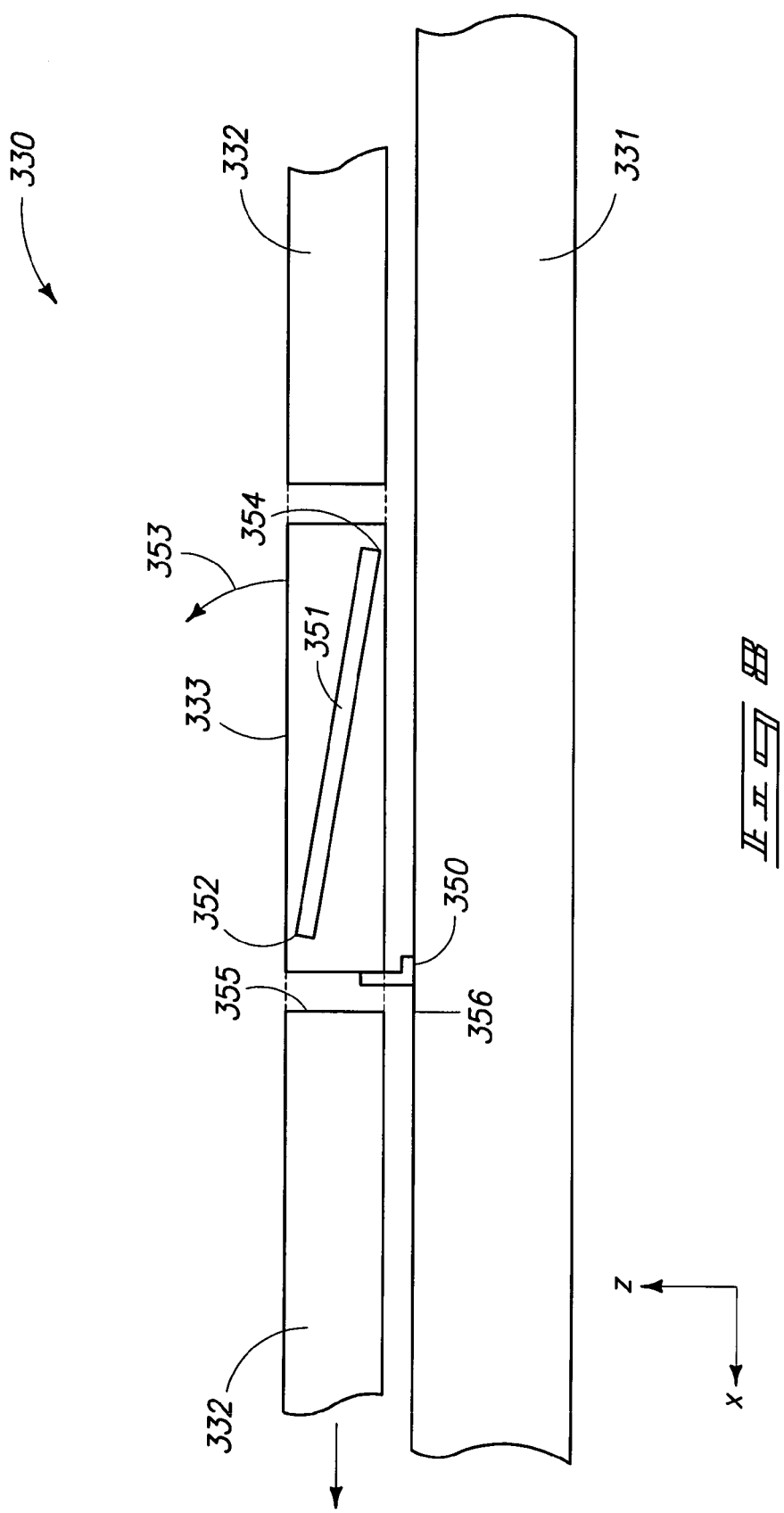

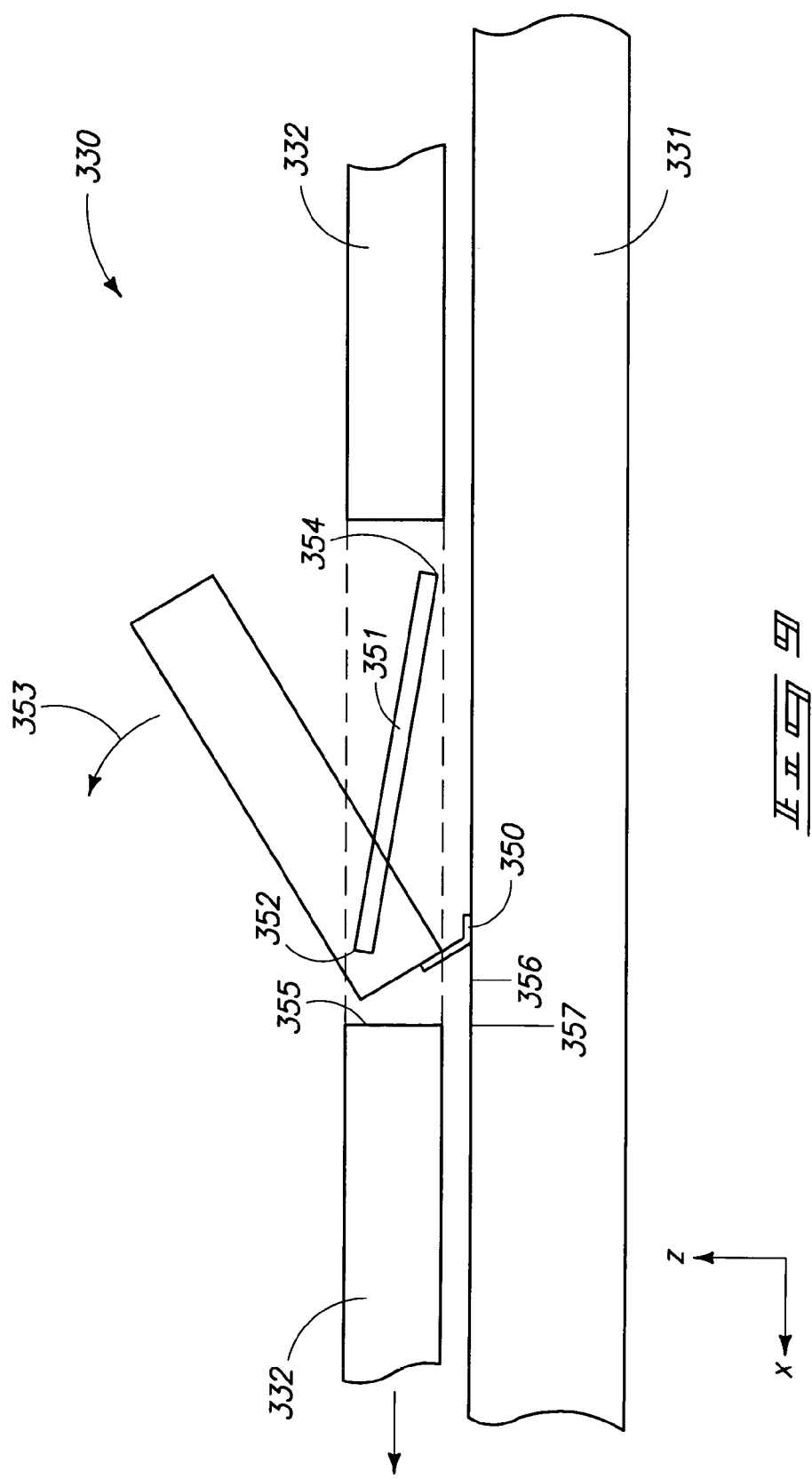

OPTICAL CHIP COUPLING SYSTEM UTILIZING MICROMACHINE ADJUSTABLE OPTICAL ELEMENTS AND A FEEDBACK CIRCUIT PROVIDING THE MICROMACHINE WITH A FEEDBACK SIGNAL CORRELATED TO AN OPTICAL SIGNAL PARAMETER

TECHNICAL FIELD

The invention pertains to an optical chip which uses micromachine controlled optical elements and a feedback signal system to maximize the optical coupling of the system. The feedback signal received by the micromachine is correlated to an optical signal parameter, and the micromachine in turn manipulates the optical element to alter the optical signal parameter.

BACKGROUND OF THE INVENTION

Optical communication systems are becoming more predominant in the telecommunication industry. In optical communication systems, the optical alignment of sources, connectors, detectors and other optical elements is important to the efficient operation of such systems. Prior alignment systems are not believed to be suitable for numerous closely spaced optical signals.

The alignment and optimization of optical elements can be degraded due to any one of a number of reasons, such as without limitation assembly produced tolerance, temperature effects and thermal mismatching, and environmental conditions such as vibration. Misalignment or the failure to initially, periodically and/or continuously optimize the relative alignment may entirely destroy an optical link, or produce unacceptably high bit errors.

As data transfer and other communications systems will continue to require more bandwidth and more highly parallel optical systems are further developed, a reliable and robust system to align and/or optimize the alignment of such optical communication systems will be desired.

It is therefore an object of this invention to provide a new adjustable optical chip micromachine coupling system.

SUMMARY OF THE INVENTION

Aspects of this invention include an adjustable optical chip with optical elements disposed to receive optical signals, micromachines operatively coupled to each of the optical elements selectively manipulate the optical elements in an optical path of the optical signal. This invention also includes a feedback circuit coupled to the micromachines, which are disposed to receive a feedback signal from the feedback circuit, wherein the feedback signals are correlated to an optical signal parameter and a corresponding selective manipulation of the plurality of optical elements by the micromachine. The manipulation of the optical element alters the optical signal parameter. The optical elements may be any one of a number of different types or kinds of optical elements, such as a diffractive or refractive optics, a combined micromirror and optical lens or just a micromirror. This aspect of the invention may also be part of an optical communications system which would further include an integrated circuit chip and an electro-optical chip integrated on the integrated circuit chip.

Further aspects of the invention may be an embodiment such as wherein the optical signal source is an optical connector, an optical chip on a second and adjacent integrated circuit chip and/or an optical multilayer board. The integrated circuit chip may also be mounted on a system circuit board.

A further aspect of this invention may be an embodiment wherein the integrated circuit chip and the electro-optical chip comprise one chip in any one of a number of ways, such as by flip-chip bonding. It will further be appreciated by those of ordinary skill in the art that further embodiments may be a configuration wherein the optical signal parameter and the optical signal condition data are the same.

This invention further contemplates process embodiments in an optical communication system, such as a method for adjusting an optical signal parameter. This method would generally involve transmitting the optical signal through the optical element, sensing optical signal condition data related to an optical signal parameter, transmitting a feedback signal to the micromachine, the feedback signal corresponding to the optical signal condition data, and then selectively manipulating the at least one optical element with the micromachine to alter the optical signal parameter.

BRIEF DESCRIPTION OF THE DRAWINGS

Embodiments of the invention are described below with reference to the following accompanying drawings depicting examples embodying the best mode for practicing the invention.

FIG. 2 is a flow diagram of an embodiment of an adjustable optical chip micromachine coupling system as contemplated by this invention;

FIG. 3 is a flow diagram of another embodiment of an adjustable optical chip micromachine coupling system as contemplated by this invention;

FIG. 4 is a block diagram illustrating one possible use of optical signal condition data; and FIG. 5 is a schematic view of another embodiment of an adjustable optical chip micromachine coupling system contemplated by this invention, showing an electro-optical portion, an integrated circuit portion and an interface portion integrated into one chip; FIG. 6 is a perspective view of a switching device which may be utilized as a micromachine in embodiments of this invention; FIG. 7 is a top view of the switching device shown in FIG. 6; FIG. 8 is a cross-sectional view of the switching device of FIG. 6; and FIG. 9 is also a cross-sectional view of the switching device of FIG. 6.

DETAILED DESCRIPTION OF THE INVENTION

Figure 1:
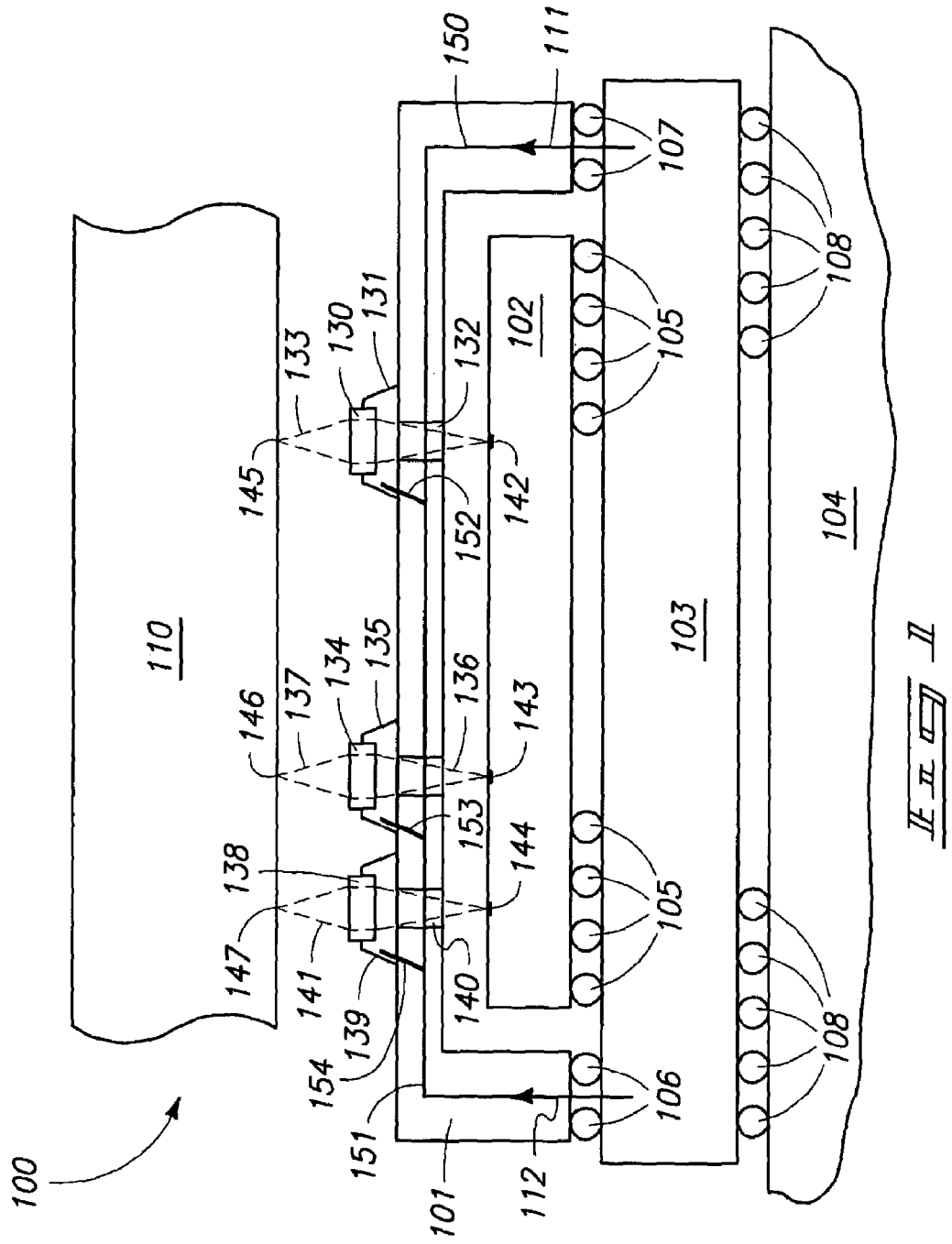
FIG. 1 is a schematic view of one embodiment of an adjustable optical chip micromachine coupling system contemplated by this invention.

Many of the manufacturing, fastening, connection, integration, electrical connection and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Accordingly, unless specifically set forth herein, the terms "a", "an", and "the" are not limited to one of such elements, but instead mean "at least one".

FIG. 1 is a schematic representation of one embodiment of an adjustable optical chip micromachine coupling system 100 as contemplated by this invention, illustrating integrated circuit chip 103, electro-optical chip 102 and optical component 110. The integrated circuit 103 may be mounted to system board 104 by any one of a number of known means, including without limitation through solder ball grid array beads 108.

Optical chip 101 is disposed between electro optical chip 102 and optical component 110. Optical waves 133, 137 and 141 are shown between optical component 110 and electro-optical chip 102 and may be traveling in either or both directions through optical elements 130, 134 and 138, respectively. Optical elements 130, 134 and 138 may be operably attached or mounted to, or contained within, optical chip 101 via any one of a number of known means. Optical signals 133, 137 and 141 pass through optical signal passageways 132, 136 and 140, respectively, for transmission with electro-optical chip 102.

The optical elements 130, 134 and 138 are controlled within the contemplation of this invention by micromachines or micro electronic machines on or within optical chip 101. Control components 131, 135 and 139 control optical elements 130, 134 and 138, respectively. Electro-optical chip 102 may be any one of a number of different types of electro-optical chips 102, including a laser and/or a detector chip. The electro-optical chip 102 may contain high-speed lasers such as vertical cavity surface emitting lasers, or high speed photodetectors, or both. Electro-optical chip 102 emits, transmits and/or receives optical signals via emitter/receivers 142, 143 and 144.

Optical component 110 may be any one of a number of optical components, including an optical connector, an optical multi-layer board, an optical chip on an adjacent board, or others, within the contemplation of this invention. Optical component 110 may include optical signal emitters/receivers 145, 146 and 147 through which optical signals are emitted, transmitted, detected or received. In the embodiment when optical component 110 is an optical multilayer board, optical waves 133, 137, 141 are coupled to the waveguides of the multilayer board by optical elements such as diffractive gratings on the multilayer board.

In the embodiment illustrated in FIG. 1, optical chip 101 is mounted directly to integrated circuit chip 103 via any one of a number of known means, including without limitation, solder ball technology.

FIG. 1 illustrates first feedback signal 111 and second feedback signal 112 being transmitted from integrated circuit chip 103 to optical chip 101. Optical chip 101 includes first feedback circuit 150 and second feedback circuit 151 which provide the means through which one or more feedback signals may be transmitted to micromachines controlling optical elements 130, 134 and 138.

Optical chip 101 is shown electrically connected to integrated circuit chip 103 through first solder ball connectors 107 and second solder ball connectors 106, and electro-optical chip 102 is illustrated operatively connected or integrated with integrated circuit chip 103 via solder balls 105. Integrated circuit chip 103 is shown attached, operatively attached, connected, or integrated with system board 104 via balls 108. Although solder balls are shown as a means of operatively connecting or integrating various components illustrated in FIG. 1, this invention is not limited to the use of solder balls for such integration but instead the components may be attached in any one of a number of known ways, including without limitation wire-bonds and stud-bonds. In some embodiments of the invention , optical chip 101, electro-optical chip 102 and integrated circuit 103 may also be integrated on one chip, as shown more fully in FIG. 5.

Feedback circuit 150 may be electrically connected to any one or more of the micromachines controlling the optical elements on optical chip 101, and feedback signal leads 152, 153 and 154 respectively connect either first feedback circuit 150 and/or second feedback circuit 151 to optical elements 130, 134 and 138.

Although three optical elements and corresponding components are shown for illustrative purposes, it will be appreciated by those of ordinary skill in the art that no particular configuration or number of optical elements is required to practice this invention. It will also be appreciated by those of ordinary skill in the art that micromachine controlled optical elements provide the optical coupling between the electro-optical chip, a laser/detector chip, and the connectors or other optical paths of the optical communications systems, which are depicted by optical component 110. The feedback signals, which may be the first feedback signal and/or the second feedback signal, are drive signals from the integrated circuit chip 103 to optical chip 101 and may be low frequency electrical signals, which may make the connection between the integrated circuit chip 103 and optical chip 101 easier to achieve. The feedback signals will automatically position the optical elements to achieve maximum optical coupling through positioning and steering of the optical elements, to alter an optical signal parameter such as power.

The optical elements may be any one of a number of different known optical elements, including lenses, mirrors, diffractive elements, holograms, or combinations of these elements. It will be appreciated by those of ordinary skill in the art that the optical elements may also be used for coupling the optical signals through free space transmission to another or similar configuration as shown in FIG. 1. By utilizing the feedback signal to the micromachines and thereby altering the one or more optical signal parameters, the optical coupling between the components may be bettered or optimized automatically and continuously within the contemplation of this invention.

In an embodiment, the integrated circuit chip 103 would receive optical signal condition data from one or more sensors in the optical communication system. In one implementation, the optical signal condition data is transmitted optically to optical chip 101 and received by photodetectors on the electro-optical integrated electro-optical chip 102. The data is transferred via solder balls 105 to integrated circuit chip 103 for processing.

The integrated circuit chip may receive information related to coupling efficiency and other data related to the optical signals measured by the sensor, such as the optical power or bit error rate in the link. Based upon the condition data received by the integrated circuit chip 103, the integrated circuit chip would perform processing of the data and provide the drive signal or feedback signals 111 and 112 to optical chip 101 to make the appropriate changes in the optical elements 130, 134 and/or 138.

The feedback signals may be specific to one or more, or all, of the micromachines and optical elements 130, 134 and 138, in controlling the system.

It will also be appreciated by those of ordinary skill in the art that the electro-optical chip 102 shown is exemplary and may contain semiconductor lasers such as Vertical Cavity Surface Emitting Laser (VCSEL), and/or high speed detectors, which may possibly be integrated with micro-optics to facilitate the optical coupling. The electro-optical chip may also be integrated chips or multi-chip modules within the contemplation of the invention and depending on the application. The electro-optical chips will generally perform any one or more of numerous potential functions, such as electrical to optical conversion, switching and/or routing of data, wavelength conversion, data rate conversion (such as high to low), amplification, and/or other functions.

FIG. 2 is a flow diagram illustrating one embodiment of this invention, showing that the optical element is originally oriented in first step 170. The optical signal is received and transmitted or forwarded by the optical element per step 171, and a sensor then senses the optical signal received from the optical element and senses optical signal condition data in step 172. At step 173, if the optical signal condition sensed for is present (for instance sensed to determine if the signal is in an optimum range), then a feedback signal is transmitted to the micromachine controlling the optical element at step 175 in order to make the appropriate adjustment to the optical element. Once the appropriate adjustment is made to the optical element, the system continues to sense the optical signal for further signal condition data for further and continuous monitoring and adjusting of the optical element.

If at step 173 the optical signal condition sensed is not present, the system continues to maintain the optical element as last oriented and continues to sense the optical signal condition data for the condition which is out of the predetermined tolerance or condition for the optical element.

FIG. 3 is a flow diagram illustrating another embodiment of this invention, showing that the optical element is originally oriented in first step 270. The optical signal is received and transmitted or forwarded by the optical element per step 271, and a sensor then senses the optical signal received from the optical element and senses optical signal condition data in step 272. At step 273, if the optical signal is optimum or in an optimum range, then a signal 274 is transmitted to the micromachine controlling the optical element at step 278 and the optical elements are fixed or retained as is. Once the optical element is fixed or set, the system would periodically continue to sense the optical signal for further signal condition data for further and continuous monitoring and adjusting of the optical element.

If at step 273 the optical signal sensed is not in the desired optimum range, at step or item 175, the system transmits a feedback signal 176 to the optical element to initiate or cause an adjustment of the optical element.

The micromachine controlled reflective surfaces or micromirrors may be practiced in any one of a number of ways within the contemplation of this invention, one exemplary way being that disclosed in U.S. Pat. No. 6,215,222, for an "Optical Cross-Connect Switch Using Electrostatic Surface Actuators", which is incorporated herein by this reference. FIGS. 6 and 7 are FIGS. 2 and 3 respectively from U.S. Pat. No. 6,215,222, and illustrate one embodiment of a micromachine that may be utilized in embodiments of this invention. Turning to FIG. 6, a switching device 330 of the optical device in accordance with an embodiment is shown. The switching device 330 includes a translator 332 and a micromirror 333 that are attached to a stator 331. The translator 332 and the stator 331 may be made of silicon. The micromirror 333 may also be made of silicon with a layer of Au for the reflective surface. The translator 332 is attached to the stator by eight translator supports 335. The translator supports 335 are affixed to the upper surface of the stator and to one of four E-shaped flexures 336 of the translator 332. The flexures 336 allow the translator 332 to move in the X-direction, while the stator 331 remains stationary. As an example, the flexures 336 may have a thickness of two (2) µm and a death of one hundred (100) µm. The micromirror 333 is attached to the stator 331 by a pivoting strip 350 (shown in FIGS. 8 and 9) that allows the micromirror 333 to rotate about the side of the micromirror 333 that is affixed to the strip. The pivoting strip may be a thin film of silicon nitride (SiN). The translator 332 includes an opening 334 that provides enough space for the micromirror 333 to pivot from the non-reflective orientation. i.e., the orientation shown in FIG. 6. to the reflective orientation, i.e., a vertical orientation such that the micromirror 333 is parallel to the YZ plane. The micromirror 333 is also attached to the translator 332, as shown in FIG. 7. The physical attachment of the micromirror 333 to the translator 332 allows the micromirror 333 to be pivoted by a lateral displacement of the translator 332. The translator 332 and the stator 331 form an electrostatic surface actuator that operates to pivot the micromirror 333 to either the reflective or non-reflective orientation. The translator 332 and the stator 331 both include electrodes located on the opposing surfaces of the translator 332 and the stator 331. When the electrostatic actuator is activated, the electrostatic forces created by applying voltaaes to the electrodes of the translator 332 and the stator can be manipulated to laterally displace the translator 332 with respect to the stator 331 in the X-direction. The lateral movement of the translator 332 pivots the micromirror 333 from the non-reflective orientation to the reflective orientation. When deactivated, the translator 332 is designed to move in the negative X-direction back to the original position. This reverse displacement of the translator 332 pivots the micromirror 333 from the reflective orientation to the non-reflective orientation. The pivoting of the micromirror 333 will be further described below.

In embodiments of the invention, the optical signal condition data may utilize a dedicated sensor to obtain or create the optical signal data, but the invention does not necessarily require a dedicated sensor. For example, in the fiber optic link as depicted in FIG. 4, transmitter 300 on first optical chip 308 sends optical data 301 to receiver 302 on second optical chip 305. Receiver 302 may then generate optical signal data 303 (such as the optical power level) to transmitter 304, which transmits optical signal data 306 to receiver 307 on first optical chip 308.

The positions of the micro-lens can be adjusted with high precision insteps of an few microns using low voltage signals. This is described for instance in Storrs Haen et al (Hewlett Packard Laboratories), "Electrostatic Surface Devices: Theoretical Considerations and Fabrication", as presented at the 1997 International Conference on Solid Sate Sensors and Actuators, Chicago, Jun. 16–19 1997.

FIG. 5 is a schematic view of another embodiment of an adjustable optical chip micromachine coupling system contemplated by this invention, showing an electro-optical portion, an integrated circuit portion and an interface portion integrated into one chip. There are like items in FIG. 5 from FIG. 1 which are similarly numbered, with FIG. 5 illustrating an integrated chip configuration, showing an interface portion 160 or zone, an electro-optical portion 161 or zone, and an integrated circuit portion 162 or zone. FIG. 5 further representatively shows arrows R1 and R2 representing rotation of the optical element and T1 and T2 to represent movement and/or translation of the optical element.

One embodiment of this invention for example utilizes micro-lens supported by electrostatic dipole surface drives capable of precise movement controls.

As will be appreciated by those of reasonable skill in the art, there are numerous embodiments to this invention, and variations of elements and components which may be used, all within the scope of this invention.

In FIG. 8, the translator 332 is situated in the original position. The original position is the resting position of the translator 332. When there are no electrostatic forces generated between the translator 332 and the stator 331. At the original position, an inner surface 355 of the translator 332 is positioned directly over a reference line 356 on the stator. When electrostatic forces are initially generated by applying voltages to the electrodes in a first voltage pattern, the translator 332 may shift slightly in either direction along the x-axis, until an equilibrium is reached. As the voltage pattern is reconfigured, the net electrostatic force along the X-axis displaces the translator 332 to the left. Since the actuation arm 351 is attached to the translator 332 at the location 354, the actuation arm 351 will be pushed in the X-direction. The movement of the actuation arm 351 creates a torque to pivot the micromirror 333 in a direction of arrow 353, which is caused by the fact that the micromirror 333 is attached to the actuation arm 351 at the location 352 and is also attached to the stator 331 by the pivoting strip 350. In FIG. 9, the translator 332 has been displaced such that the inner surface 355 of the translator 332 is now positioned over a reference line 357 on the stator 331. The displacement of the translator 332 over the distance between the reference lines 356 and 1357 has pivoted the micromirror 333 by a significant amount, as shown in FIG. 9. The micromirror 333 may also be pivoted to an upright position, i.e., the reflective orientation. The micromirror 333 can be incrementally repositioned to the non-reflective orientation, shown in FIG. 8 by displacing the translator 332 in the negative X-direction, such that the inner surface 355 of the translator 332 is positioned over the reference line 356 on the stator 331. The translator 332 can be displaced in the negative X-direction by applying voltages to the stator drive electrodes in the reverse sequence of the voltage patterns that are described above. In an alternative operation, the voltages that are applied may be terminated to eliminate the electrostatic forces that are responsible for the lateral movement of the translator 332. When these electrostatic forces are removed the flexures 336 of the translator 332 will return to the normal state, thereby laterally displacing the translator 332 to the original position.

In compliance with the statute, the invention has been described in language more or less specific as to structural and methodical features. It is to be understood, however, that the invention is not limited to the specific features shown and described, since the means herein disclosed comprise forms of putting the invention into effect. The invention is, therefore, claimed in any of its forms or modifications within the proper scope of the appended claims appropriately interpreted in accordance with the doctrine of equivalents.

What is claimed is:

1. An optical system, comprising:
    an optical element associated with an optical chip and disposed to receive an optical signal;
    a circuit configured to receive optical signal condition data associated with a bit error rate and in response thereto generate one or more feedback signals correlated to an optical signal parameter associated with the optical signal, wherein the circuit is associated with an integrated circuit chip electrically connected to the optical chip; and
    a micromachine associated with the optical chip and configured to receive the one or more feedback signals from the circuit and configured to selectively manipulate the optical element based on the one or more feedback signals, wherein the selective manipulation of the optical element alters the optical signal parameter.

2. The optical system of claim 1, wherein the micromachine is configured to rotate the optical element relative to a first axis in response to the one or more feedback signals.

3. The optical system of claim 2, wherein the micromachine is configured to rotate the optical element relative to a second axis in response to the one or more feedback signals.

4. The optical system of claim 3, wherein the micromachine is configured to rotate the optical element relative to a third axis in response to the one or more feedback signals.

5. The optical system of claim 1, wherein the micromachine is configured to translate the optical element relative to a first axis in response to the one or more feedback signals.

6. The optical system of claim 5, wherein the micromachine is configured to translate the optical element relative to a second axis in response to the one or more feedback signals.

7. The optical system of claim 6, wherein the micromachine is configured to translate the optical element relative to a third axis in response to the one or more feedback signals.

8. An optical communication system comprising:
    an optical chip portion comprising an optical element disposed to receive an optical signal and a micromachine operatively coupled to the optical element; and
    an integrated circuit chip portion electrically coupled to the optical chip portion, wherein the integrated circuit chip comprises a circuit configured to receive optical signal condition data associated with a bit error rate and provide one or more feedback signals correlated to an optical signal parameter associated with the optical signal,
    wherein the micromachine is configured to selectively manipulate the optical element based on the one or more feedback signals such that the selective manipulation of the optical element alters the optical signal parameter.

9. The optical communication system of claim 8, further comprising an electro-optical chip portion coupled to the integrated circuit chip portion.

10. The optical communication system of claim 9, further comprising an optical component portion, wherein the electro-optical chip portion is optically coupled to the optical component portion through the optical element.

11. The optical communication system of claim 10, wherein the integrated circuit chip portion is mounted on a system board.

12. The optical communication system of claim 9, wherein the integrated circuit chip portion, the electro-optical chip portion, and the optical chip portion comprise one chip.

13. A method for selective manipulation of an optical element in an optical communication system comprised of an optical chip portion and an integrated circuit chip portion, wherein the optical element and a micromachine operatively coupled to the optical element are associated with the optical chip portion and a circuit is associated with the integrated circuit chip portion, the method comprising:

transmitting an optical signal towards the optical element;

measuring a bit error rate to generate optical signal condition data;

receiving optical signal condition data based on the transmission of the optical signal;

generating one or more feedback signals based on the optical signal condition data, wherein the one or more feedback signals generated by the circuit is correlated to an optical signal parameter; and selectively manipulating the optical element based on the one or more feedback signals, wherein the selective manipulation of the optical element by the micromachine alters the optical signal parameter.

14. The method of claim 13, wherein the optical signal condition data comprises an optical power value of the received optical signal.

* * * * *